(12) United States Patent
Sato et al.

(10) Patent No.: US 6,176,021 B1
(45) Date of Patent: *Jan. 23, 2001

(54) MICROMETER

(75) Inventors: Hajime Sato; Kiyohiro Nakata; Chikashi Hamano; Toshihiko Mishima, all of Kure; Tohru Fujimitsu, Higashihiroshima, all of (JP)

(73) Assignee: Mitutoyo Corporation, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/036,675

(22) Filed: Mar. 9, 1998

(30) Foreign Application Priority Data

Mar. 12, 1997 (JP) .................................................... 9-057643
Mar. 12, 1997 (JP) .................................................... 9-057644

(51) Int. Cl.[7] ............................................. G01B 3/18
(52) U.S. Cl. ................................................. 33/813; 33/831
(58) Field of Search ............................. 33/813, 831, 815, 33/783, 814, 816, 817, 818, 819, 820, 821, 822, 823, 824, 825, 826, 827, 828, 829, 830; 29/434; 72/379.2

(56) References Cited

U.S. PATENT DOCUMENTS

| | | | |
|---|---|---|---|
| 361,056 | * 4/1887 | Emery | 33/704 |
| 661,562 | * 11/1900 | Starrett | 33/783 |
| 769,179 | * 9/1904 | Spalding | 33/704 |
| 862,765 | * 8/1907 | Shaffer | 33/557 |
| 1,318,726 | * 10/1919 | Ciha | 33/817 |
| 1,361,406 | * 12/1920 | Romig | 33/826 |
| 1,388,034 | * 8/1921 | Gillespie | 33/826 |
| 2,357,066 | * 8/1944 | Adams | 33/813 |
| 2,737,215 | * 3/1956 | Larson | 72/336 |
| 2,835,040 | * 5/1958 | D'Elia | 33/813 |
| 3,787,982 | * 1/1974 | Anderson | 33/818 |
| 4,062,120 | * 12/1977 | Lacagnina et al. | 33/819 |
| 4,070,760 | * 1/1978 | Roth et al. | 33/783 |
| 4,550,507 | * 11/1985 | Nishikata | 33/701 |
| 4,860,570 | * 8/1989 | Perrault et al. | 72/379.2 |
| 5,249,799 | * 10/1993 | Chang | 473/575 |
| 5,441,288 | * 8/1995 | Rebrig | 280/33.991 |
| 5,920,198 | * 7/1999 | Suzuki et al. | 324/662 |

* cited by examiner

Primary Examiner—Andrew H. Hirshfeld
Assistant Examiner—R. Alexander Smith
(74) Attorney, Agent, or Firm—Oliff & Berridge, PLC

(57) ABSTRACT

A micrometer includes a main body holding an anvil at one end portion and a spindle at the other end portion through an inner sleeve is formed with a frame which is made by placing a pair of frame elements, which are formed by bending metal plates, one upon the other to reduce weight while ensuring rigidity. The outside of the frame is covered with resin to reduce the weight, enhance the rigidity, and prevent the influence caused by the heat of hand when the frame is gripped.

12 Claims, 8 Drawing Sheets

F I G. 5
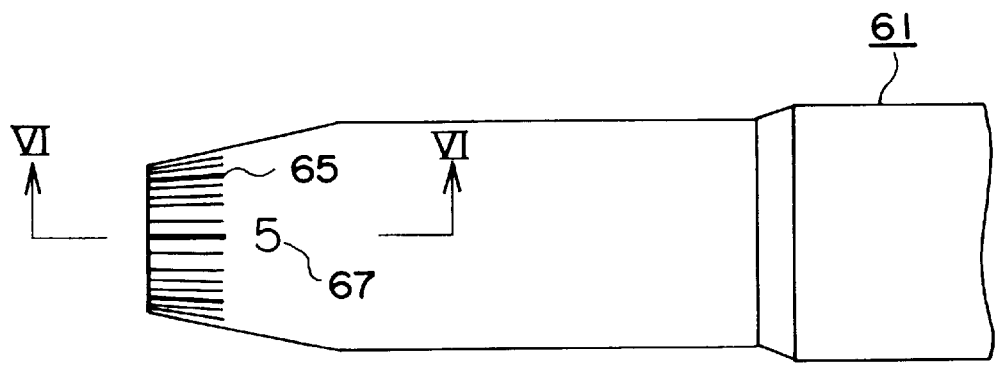
F I G. 6
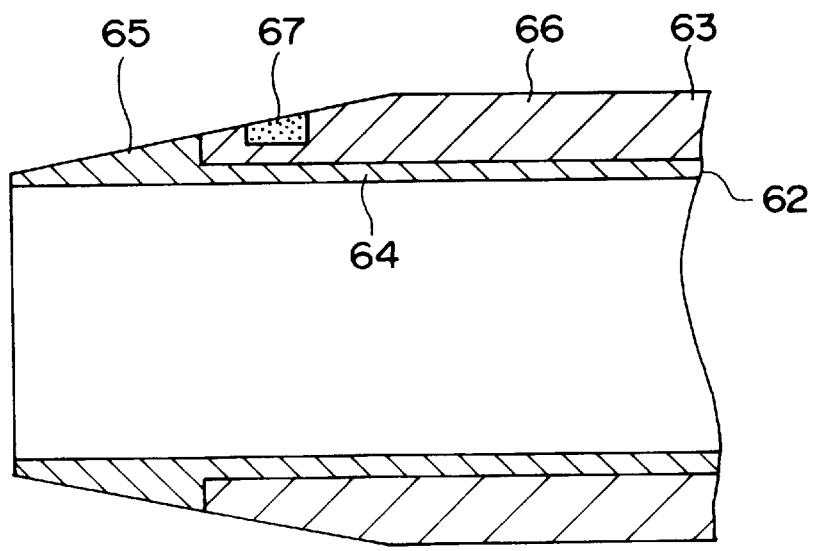

MICROMETER

BACKGROUND OF THE INVENTION

1. Field of the Invention

This invention relates to a micrometer. Particularly, it relates to a micrometer which is designed to reduce the cost and weight.

2. Description of the Related Art

As shown in FIG. 10, a micrometer comprises an almost U-shaped main body 101, an anvil 102 held at an end portion of the main body 101, a spindle 104 screwed into the other end portion of the main body 101 through an inner sleeve 103 to move toward and away from the anvil 102, an outer sleeve 105 placed and fixed onto the outside of the inner sleeve 103, a thimble 106 rotatably covered on the outside of the outer sleeve 105 and integrally connected with the spindle 104, and a ratchet mechanism 107 which slips when an excess load is applied on the spindle 104, and is provided at the rear end of the spindle 104.

On the outer circumferential surface of the outer sleeve 105, a graduation 108 of a main scale is formed at a predetermined pitch along the axial direction, and on the outer circumferential surface of the thimble 106, a graduation 109 of a vernier scale is formed at a predetermined pitch along the circumferential direction. By these graduations 108, 109, the amount of displacement of the spindle 104 to the anvil 102 can be measured. In other words, dimensions of the object which is held between the anvil 102 and the spindle 104 can be measured.

However, since the main body 101 of the conventional micrometer is molded by casting, there is a disadvantage that the production costs are high. The processes of producing the main body comprise following steps of: making a mold having a cavity which is equivalent in size and shape as that of the main body; pouring a molten sintered alloy or ductile iron (FCD400) into the cavity; taking out the casting from the split mold after cooling the molten metal; sintering the casting; removing the burrs on the casting; and boring holes on the casting to press fit the anvil 102 and the inner sleeve 103. Therefore it needs much expense in time, effort and cost.

In addition, such castings being heavy in weight, it also brings up a disadvantage of spoiling the handling properties and operability, when it is used as a micrometer which performs measuring while holding it in one hand.

Besides, when the measurement is carried out with supporting a part of the main body 101 by hand, the heat of hand is directly transferred to the main body 101, resulting in the thermal expansion of the main body 101. Therefore the measures to get rid of the influence become necessary. Conventionally, as one of the measures for this point, a cover 110 has been attached with screws on the portion of the main body 101 where it is gripped by hand. However, it results in, not only an increase in weight and size but also the increase in time and labor for the attachment and cost of it.

It is an object of the present invention to provide a micrometer which enables it to reduce the cost and the size.

It is another object of the present invention to provide a micrometer which can restrain the influence of thermal expansion caused by the heat of hand.

SUMMARY OF THE INVENTION

In a micrometer having a main body which has an anvil at one end portion and holds a spindle being able to move toward and away from the anvil at the other end portion through an inner sleeve, the micrometer according to the present invention is characterized in that the main body has a frame formed by bending metal plate stamped out in a designated size and shape, an anvil holding portion to hold the anvil at one end portion on the flame, and an inner sleeve holding portion to hold the inner sleeve at the other end portion on the flame, both holding portions being processed by bending.

Preferably, light and highly rigid material, such is cold-rolled steel (SPC-C) should be used as the metal plate. The use of the flame formed by the bending process of such metal plate enables it to reduce the cost and weight compared with the conventional article of a cast metal obtained by casting, while restraining the deformation caused by the measuring pressure, in other words, maintaining the rigidity required for the measurement.

When a metal having a similar linear expansion coefficient to that of the spindle is used as the metal plate, the elongation of the frame will be approximtely equal to the elongation of the spindle under the temperature change of the working environment. Therefore, the measurement with a high precision can be maintained without any deviation from the base point.

Since the anvil holding portion and the inner sleeve portion are prepared through a bending process of the frame of the present invention, the conventional hole boring process which is required to press fit the anvil and the inner sleeve, becomes unnecessary. Therefore it becomes possible to reduce the cost on this point, too.

In the above structure, the outer surface of the frame can be either covered with resin or coated with a coating agent.

It is preferable to use, as a resin, a glass-fiber reinforced engineering plastic, such as polyphenylene sulfite (PPS) and the like, which has small thermal conductivity, similar linear expansion coefficient to the frame, and excellent tenacity, heat resistance, burning resistance, and chemical resistance. As for a coating material, it is preferable to use a substance having the same properties as that of the above resin. By using such resin and coating material, it is possible to improve the rigidity, and at the same time, since the temperature of a hand does not directly transfer to the frame when the frame is gripped with a hand during measurement, it is also possible to restrain the influence of the thermal expansion caused by the heat of hand while the weight reduction is ensured.

As for a covering method of the outer surface of the frame with resin, the resin can be molded through the injection molding, using the frame as an insert part. In more detail, after the frame is set in a cavity of the mold, the resin can be injected on the periphery of the frame. According to the aforementioned method, while the anvil holding portion and the inner sleeve holding portion of the frame are holding the anvil and the inner sleeve respectively, the frame and the anvil and the inner sleeve are unitedly combined with one another by the resin.

By providing a first circular projection whose outer diameter is almost equal to the inner diameter of the inner sleeve holding portion of the frame, a second circular projection whose outer diameter is shorter than the outer diameter of the first circular projection and which has a bumpy outer surface, and a circular tread whose outer diameter is shorter than the outer diameter of the second circular projection, on the outer circumferential surface of the inner sleeve, it is possible to decide the position relating to the frame through the first circular projection, and it is also possible to ensure the connectivity in the radial direction through the second circular projection, and the connectivity in the thrust direction through the circular tread.

The frame can be made with one sheet of a metal plate, but it is desirable to use several sheets of the metal plates, for example, a pair of the frame elements, which are formed through a bending process of the metal plate stamped out in a designated shape and size, placed one upon another. By taking this way, the rigidity of the frame can be further enhanced and the frame can be easily produced because what is required is only several sheets of the frame elements stamped out with a press machine and the like, and put one upon another.

In order to enhance the rigidity of the frame, it is desirable to provide a rib on the frame element. It is preferable to form the rib along the outer circumferential edge of the frame element.

When providing a convex portion on one frame element, and a concave portion on the other frame portion, a pair of the frame elements can be placed one upon the other with high precision in positioning by simply fitting one to the other.

Furthermore, when semi-cylindrical portions are formed on each frame element, a circular anvil holding portion and an inner sleeve holding portion can be formed by placing a pair of the frame elements, one upon the other.

In the micrometer of the present invention, which has a main body holding an anvil at one end and a spindle moving toward and away from the anvil at the other end through an inner sleeve, the micrometer is characterized in that the main body is formed with an engineering plastic.

As for the engineering plastics, it is preferable to use glass-fiber reinforced engineering plastic, such as polyphenylene sulfite (PPS) and the like, which has a low thermal expansion rate, high rigidity and is excellent in heat resistance, burning resistance, and chemical resistance. By using the engineering plastics described above, it is possible to reduce the cost and weight compared with the conventional article of a cast metal obtained by casting, while the deformation caused by the measuring pressure is restrained, in other words, the rigidity required for the measurement is maintained.

In addition, the micrometer of the present invention has a main body which holds an anvil at one end and a spindle moving toward and away from the anvil at the other end through an inner sleeve, an outer sleeve being inserted on the outside of the inner sleeve, and a thimble being integrally connected with the spindle is provided in a rotatable manner on the outside of the outer sleeve. In such a micrometer, the main body is characterized by being made of an engineering plastic and the inner sleeve and the thimble being made of resin.

Since not only the main body but also the inner sleeve and the thimble are reduced in weight in these formation, the total weight is also reduced. Besides, since the main body is reduced in weight as a whole, in other words, not partially reduced in weight, the total weight balance is also good, and handling properties and the operability are not spoiled.

Furthermore, since the outer sleeve and the thimble are molded with resin, the heat of fingers is difficult to transfer to the spindle when the thimble is turned with the fingers, and the influence of the thermal expansion caused by the heat of hand can be restrained.

In the structure described above, a higher rigidity is sometimes required for a large sized micrometer. In such a case, it is allowed to provide a reinforcement member which connects between the anvil and the inner sleeve, as necessary.

There is no special limitation for the reinforcement member, but by forming the reinforce member through bending process of a metal plate, the cost can be reduced.

BRIEF DESCRIPTION OF THE DRAWINGS

FIG. 5 is a front view showing a thimble of the above embodiment;

FIG. 6 is a sectional view taken along the VI—VI line in FIG. 5;

DETAILED DESCRIPTION OF THE PREFERRED EMBODIMENT(S)

Figure 1:
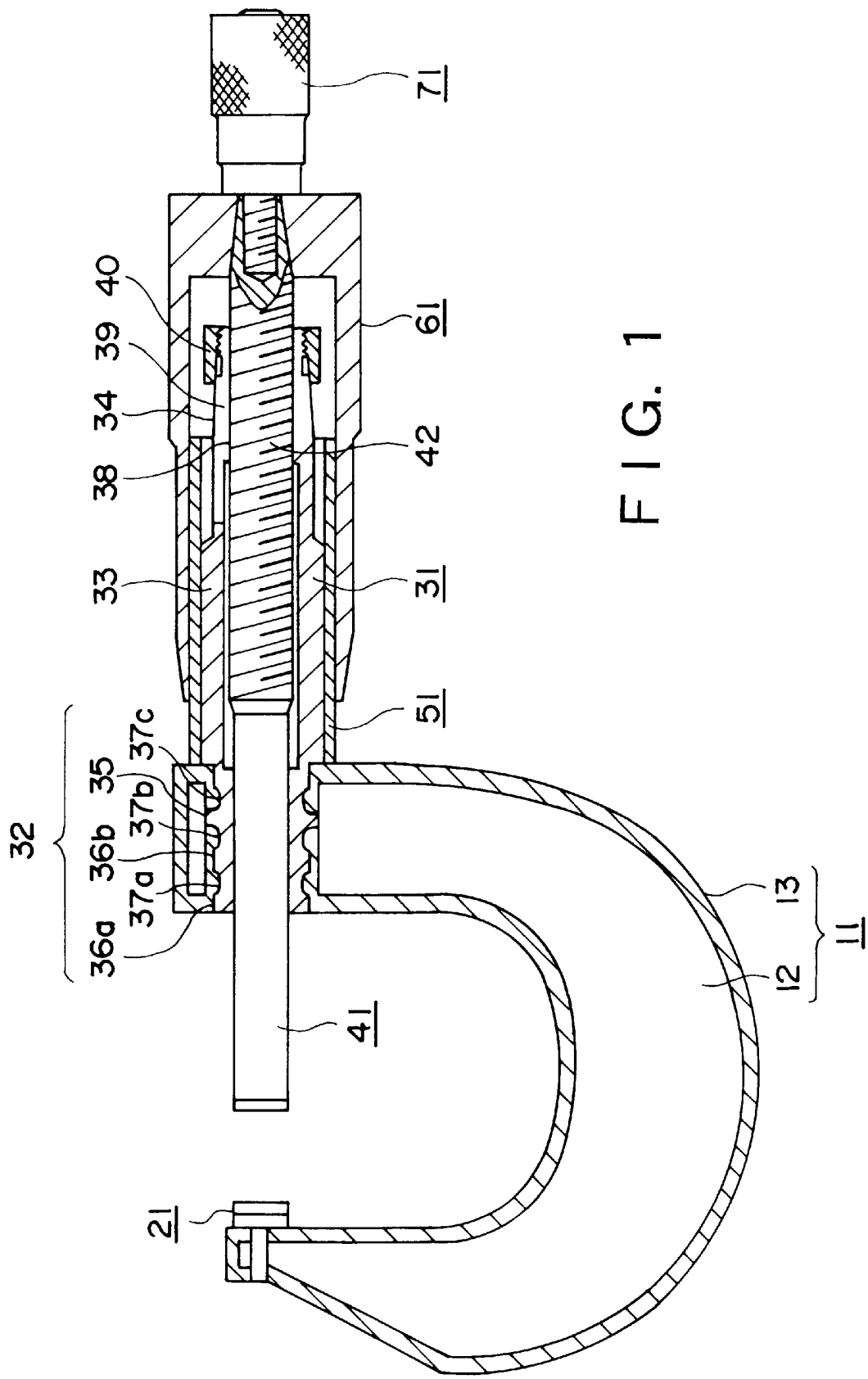
FIG. 1 is a sectional view showing a first embodiment of a micrometer according to the present invention.

The preferred embodiments of the present invention will be explained below with reference to the attached drawings.
The first embodiment FIG. 1 is a sectional view showing a micrometer of a first embodiment. The micrometer has an almost U-shaped main body 11, a metal (such as cemented carbide) anvil 21 held by one end portion of the main body 11, a spindle 41 made of a metal (such as alloy tool steel: SKS-3), screwed in a movable manner toward and away from the anvil 21 at the other end portion of the main body 11 through an inner sleeve 31, an outer sleeve 51 covered on and fixed to the outside of the inner sleeve 31, a thimble 61 covered in a rotatable manner to the outside of the outer sleeve 51 and integrally connected to the spindle 41, and a ratchet mechanism 71 which is provided at the rear end of the spindle 41 and slips when an excess load is applied on the spindle 41.

The main body 11 is constituted of a frame 12 formed by a bending process of a metal plate stamped out in a designated shape and size, and a resin 13 to cover the outer surface of the frame 12. In other words, the main body 11 is of laminated structure, in which the resin 13 is injection-molded on the outside of the frame 12, using the metal plate frame 12 as an insert part.

Figure 2:
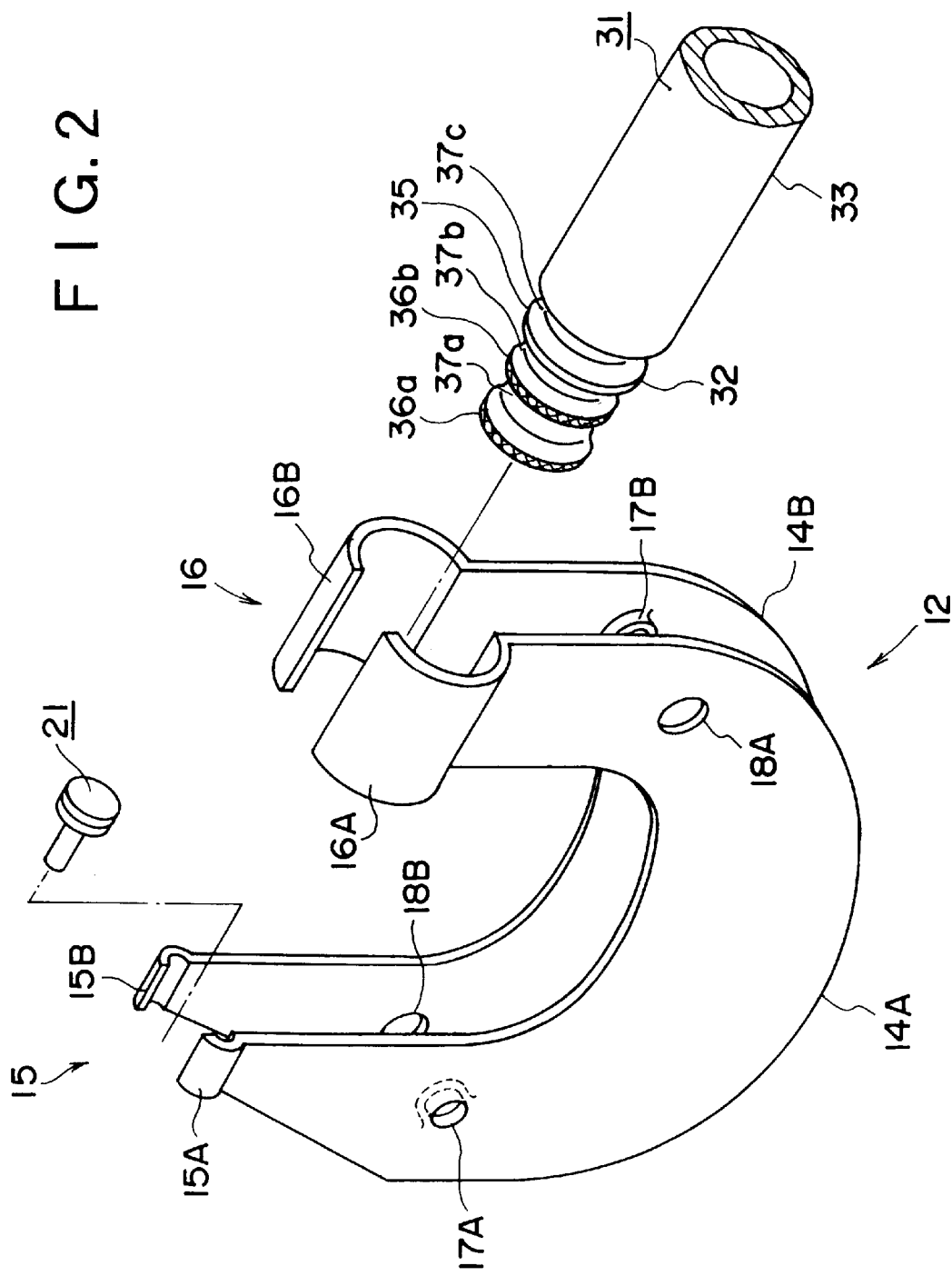
FIG. 2 is an exploded perspective view showing principal portion of the above embodiment.

As shown in FIG. 2, the frame 12 is formed with a pair of the frame elements 14A and 14B which are made by bending the metal plate (for example a cold-rolled steel: SPC-C) stamped out in a U-shape with a press machine and the like, placed one upon the other. At both the end portions of the frame elements 14A, 14B, semi-cylindrical portions 15A, 15B, 16A, and 16B are formed by a bending process to make up the holding portions 15 and 16 which hold the anvil 21 and the inner sleeve 31 respectively, when the frame elements 14A and 14B are placed one upon the other, and in the neighborhood thereof, convex portions 17A, 17B and concave portions 18A, 18B are formed respectively. Incidentally, these convex portions 17A, 17B and the concave portions 18A, 18B are processed at the same time when the metal plate is stamped out by a press machine.

As for the resin 13, a glass-fiber reinforced engineering plastic which has a low thermal expansion rate, and an approximate linear expansion coefficient to that of the frame 12, and is excellent in rigidity, heat resistance, burning resistance, and chemical resistance, here, polyphenylene sulfite (PPS) is used.

The inner sleeve 31 is made of metal (for example, free-machining leaded steel) through a cutting process and is provided with an insert cylinder portion 32 which is inserted into the inner sleeve holding portion 16 constituted of the semi-cylindrical portions 16A and 16B on the frame 12, a middle cylinder portion 33, and a screw cylinder portion 34 which is screwed with a screw portion 42 of the spindle 41.

The insert cylinder portion 32 is formed to have an inner diameter which is just fitted without gap to the outer diameter of the spindle when the spindle 41 is inserted to the cylinder. And as shown in FIG. 2, on the circumferential surface of the insert cylinder portion, a first circular projection 35 whose outer diameter is almost equal to the inner diameter of the inner sleeve holding portion 16 on the frame 12, second circular projections 36a and 36b whose outer diameter is smaller than the outer diameter of the first circular projection 35 and have bumpy outer surfaces made by a knurling tool, and circular treads 37a, 37b, and 37c which are provided on both sides of the first circular projection 35 and between the second circular projections 36a, 36b, respectively, and whose outer diameter is smaller than the outer diameter of the second circular projections 36a, 36b, are formed respectively. Incidentally, a cross sectional shape of circular treads 37a, 37b, and 37c is formed in a semicircular groove so that the resin 13 is easy to go around the frame 12.

The middle cylinder portion 33 is formed to have an inner diameter slightly larger than the outer diameter of the spindle 41.

The screw cylinder portion 34 has a female screw 38 which is screwed with the screw portion 42 of the spindle 41 inside thereof, and has a slit 39 along the axial direction on the circumferential surface, and a nut 40 is screwed.

Figure 3:
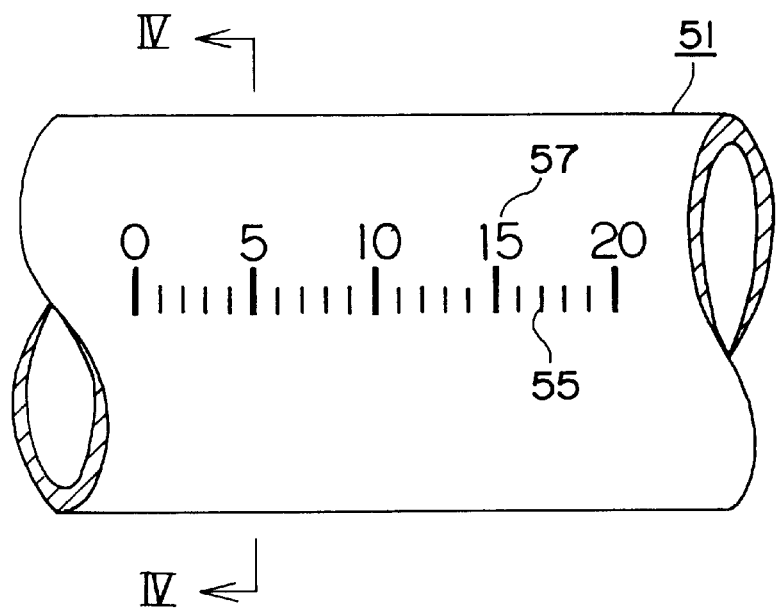
FIG. 3 is a front view showing an outer sleeve of the above embodiment.
Figure 4:
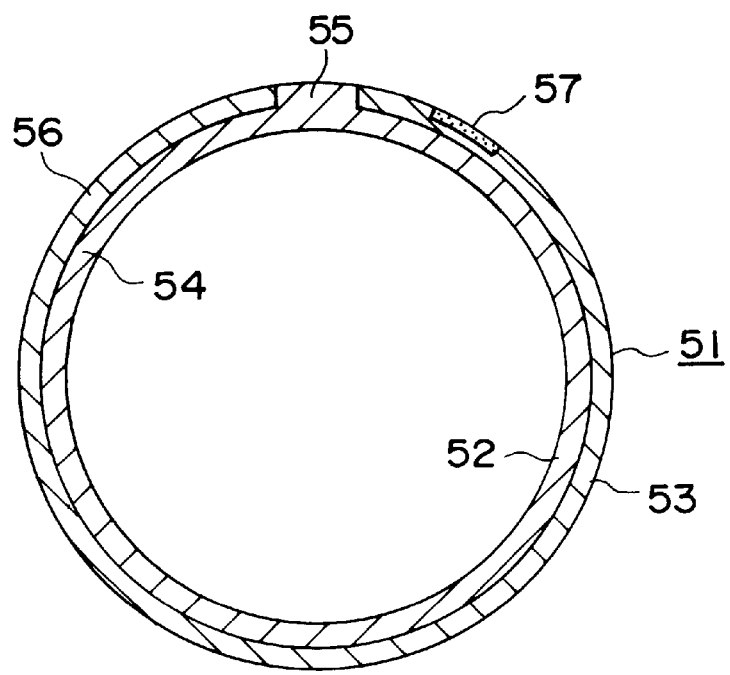
FIG. 4 is a sectional view taken along the IV—IV line in FIG. 3.

As shown in FIG. 3 and FIG. 4, the outer sleeve 51 is formed in a cylindrical shape through double color injection molding using two kinds of resin 52 and 53 having two different colors. To be more specific, a cylindrical base tube 54 and a graduation 55 protruding toward the outside on the outer circumferential surface of the base tube 54 along the axial direction at predetermined intervals are molded by the resin 52, and an outside skin 56 which covers the outer surface of the base tube 54 excluding the graduation 55 portion, is molded by the resin 53,. On the outside skin 56, numerals 57 are formed in accordance with the graduation 55 at the predetermined intervals by laser marking (a sign, letter or picture is drawn with laser irradiation by causing a change on the surface state at a point of irradiation). Here, the resin 52 is a black resin and the resin 53 is a white resin, both of which change the color into black when they are irradiated by a laser.

As shown in FIG. 5 and FIG. 6, the thimble 61 is molded in a cylindrical shape through double injection molding of two kinds of resins 62 and 63 which have different colors from each other. More specifically, the cylindrical base tube 64 and the graduation 65 protruding toward the outside at predetermined intervals on the circumferential surface at the end portion of the base tube 64, are molded by the resin 62, and an outside skin 66 covering the outside of the base tube 64 excluding the graduation 65 portion, is molded by the resin 63. On the outside skin 66, numerals 67 are formed in accordance with the graduation 65 at predetermined intervals by laser marking. Here, the resin 62 is a black resin and the resin 63 is a white resin, both of which change color into black when they are irradiated with a laser.

Incidentally, the resin 52, 53 which form the outer sleeve 51 and the resin 62, 63 which form the thimble 61, are not required to have the same high rigidity as the resin 13 which forms the main body 11, but a resin having heat resistance, burning resistance and chemical resistance is desirable.

Then, the method of the production will be explained hereafter.

A pair of the frame elements 14A and 14B are prepared through bending and stamping process of a metal plate and unified by placing one upon the other. At this time, the convex portions 17A, and 17B are inserted to the concave portions 18A, and 18B. Then, the semi-cylindrical portions 15A and 15B, 16A and 16B of each frame element 14A and 14B are fitted together to form the cylindrical anvil holding portion 15 and the inner sleeve holding portion 16. The anvil 21 and the insert cylinder portion 32 of the inner sleeve 31 are inserted (press-fitted) into thus formed anvil holding portion 15 and the inner sleeve holding portion 16.

After the frame 12 thus prepared is set in the cavity of the mold as an inserting part, the resin 13 is inserted and filled up into the cavity. The resin 13 thus filled into the cavity covers the outer surface of the frame 12 and at the same time flows into the gap between the anvil holding portion 15 and the anvil 21, and the gap between the inner sleeve holding portion 16 and the insert cylinder portion 32 of the inner sleeve 31 (refer to FIG. 1). Thus, the frame 12, the anvil 21 and the inner sleeve 31 are integrally connected with each other.

Next, the outer sleeve 51 is put and fixed on the outside of the inner sleeve 31, the spindle 41 being inserted into the inside of the inner sleeve 31 and the screw member 42 of the spindle 41 is screwed to the female screw 38 of the inner sleeve 31. Here, the clearance between the spindle 41 and the inner sleeve 31 is adjusted by the nut 40. Then the thimble 61 is put on the outside of the outer sleeve 51 and the thimble 61 and the spindle 41 are unified with the ratchet mechanism 71. Thus, the micrometer is produced.

According to the first embodiment, since the main body 11 which holds the anvil 21 at one end and the spindle 41 at the other end through the inner sleeve 31 is prepared with the frame 12 formed by stamping and bending of metal plate, it is possible to reduce cost and weight compared with the casted article obtained by conventional casting, while keeping the rigidity required during the measurement and the accuracy against the temperature change of the working environment. Therefore the improvement of handling properties and operability can be expected.

Since the outer sleeve 51 and the thimble 61 as well as the main body 11 are molded with the resin 52, 53, 62 and 63, the weight of the whole micrometer can be reduced. Therefore, from this point, the improvement of handling properties and operability can also be expected. Moreover, since the weight of the micrometer is reduced not partially but totally, the weight balance which is an important property in using a micrometer can be maintained well.

Furthermore, since the outer surface of the frame 12 is covered with the resin 13 by injection molding, using the frame 12 as an inserting part, the heat of hand is not directly transferred to the frame 12, when the frame 12 is grasped by hand at the time of measurement. Therefore it is possible to restrain the influence of thermal expansion by the heat of hand while the weight reduction can be achieved.

Besides, since the outer sleeve 51 and the thimble 61 are also molded with the resin 52, 53, 62 and 63, the heat from fingers is hard to transfer to the spindle 41, when the thimble 61 is turned with the fingers. Therefore, it is possible to restrain the influence of thermal expansion by the heat of hand.

And since a pair of the frame elements 14A and 14B which are prepared by stamping and bending a metal plate and placed one upon the other is used for the frame 12, the rigidity of the frame 12 is enhanced. And the frame can be easily produced because what is required is only several sheets of the frame elements 14A and 14B stamped out with a press machine and the like, and placed one upon the other.

Besides, since the convex portions 17A, 17B are formed on one of the frame elements 14A and 14B, and the concave portions 18A, 18B are formed on the other of the frame elements 14A and 14B, a pair of the frame elements 14A, 14B can be easily placed one upon the other with high accuracy by only fitting them to each other.

Since the semi-cylindrical portions 15A, 15B, 16A and 16B are formed on each frame element 14A and 14B, the circular anvil holding portion 15 and the inner sleeve holding portion 16 can be constructed when a pair of the frame elements 14A and 14B are placed one upon the other.

Additionally, the anvil 21 is inserted into the anvil holding portion 15, and the insert cylinder portion 32 of the inner sleeve 31 is inserted into the inner sleeve holding portion 16. Since the injection molding of the resin 13 is carried out by using the above structure as an inserting part, the above portions can be integrally connected with each other through the resin 13. Owing to the above configuration, the rigidity of the total system can be enhanced.

And since the first circular projection 35 whose outer diameter is almost equal to the inner diameter of the inner sleeve holding portion 16 of the frame 12, the second circular projections 36a and 36b which have smaller outer diameters than the outer diameter of the first circular projection 35 and have a bumpy outer surface, and the circular treads 37a, 3,7b, and 37c which have smaller outer diameters than the outer diameters of the second circular projections 36a and 36b, are provided on the circumferential surface of the insert cylinder portion 32 of the inner sleeve 31, it becomes possible to decide the position of the frame 12 by means of the first circular projection 35, and it becomes possible to ensure the connectivity along the radial direction by means of the second circular projections 36a and 36b, and to ensure the connectivity along the thrust direction by means of the circular treads 37a, 37b, and 37c.

Since the outer sleeve 51 and the thimble 61 as well as the graduations 55 and 65 are molded with two differently coloured resins 52 and 53, 62 and 63 by double color injection molding, and after that, the numerals 57, 67 are formed by laser marking, the production of these parts can be carried out simply and at a low cost.

Though the frame 12 is formed with a pair of the frame elements 14A and 14B placed one upon the other in the first embodiment, it is acceptable to form the frame with only one sheet of the frame element or more than three sheets of the frame elements.

Figure 7:
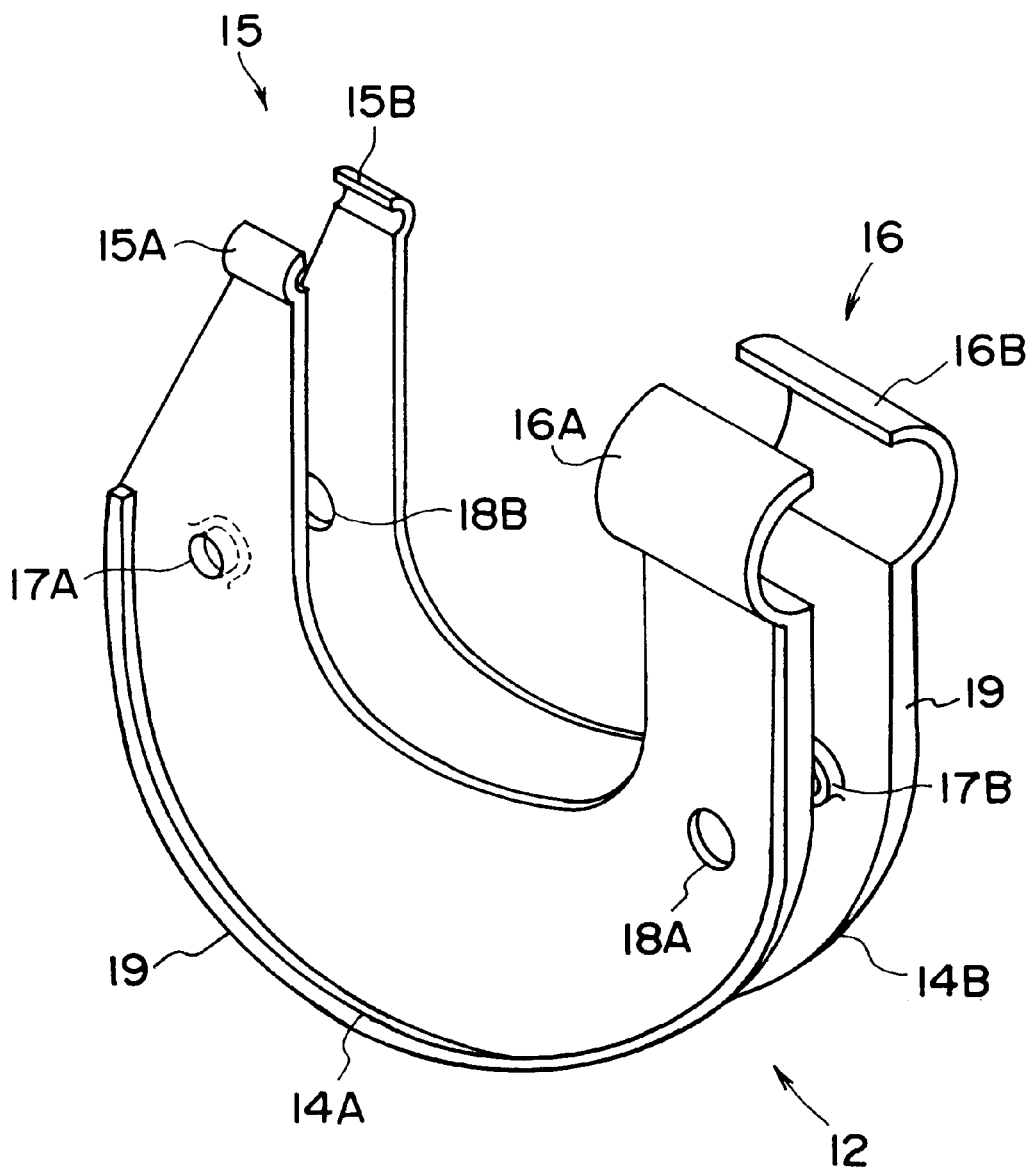
FIG. 7 is a perspective view showing a state to form a rib on the frame constituting member with a rib formed thereon of the above embodiment.

As a measure to enhance the rigidity of the frame 12 when necessary, a rib 19 may be formed along the outer peripheral end portion of each frame element 14A and 14B as shown in FIG. 7. The rib 19 may be formed not only along the outer peripheral end portion but also along the inner peripheral end portion.

In the above embodiment, the outer surface of the frame 12 is covered with the resin 13, which, however, can be omitted. Alternatively, the frame 12 may be coated with a coating agent having heat resistance, burning resistance, and chemical resistance.

The second embodiment

Figure 8:
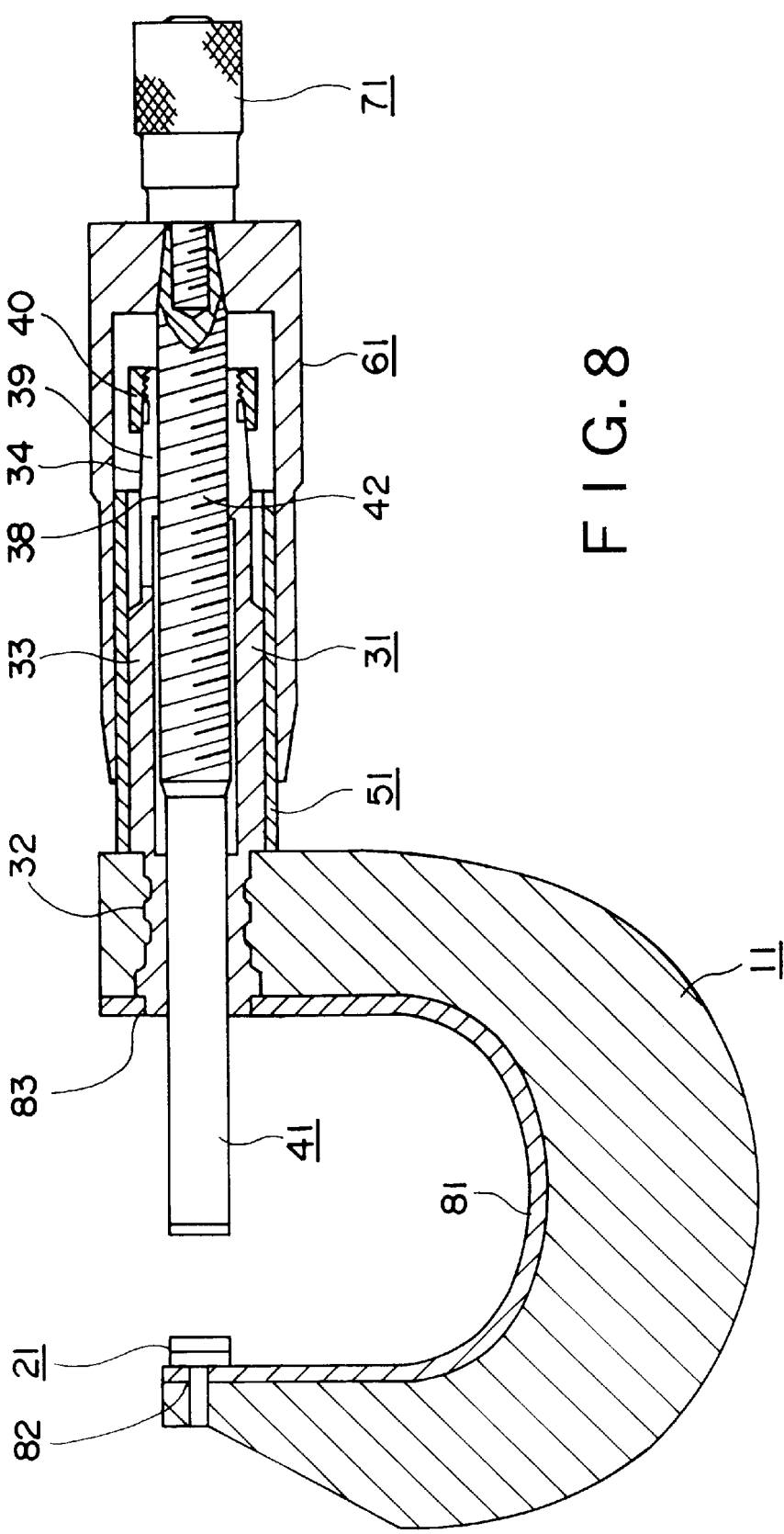
FIG. 8 is a sectional view showing a second embodiment of the micrometer according to the present invention.
Figure 9:
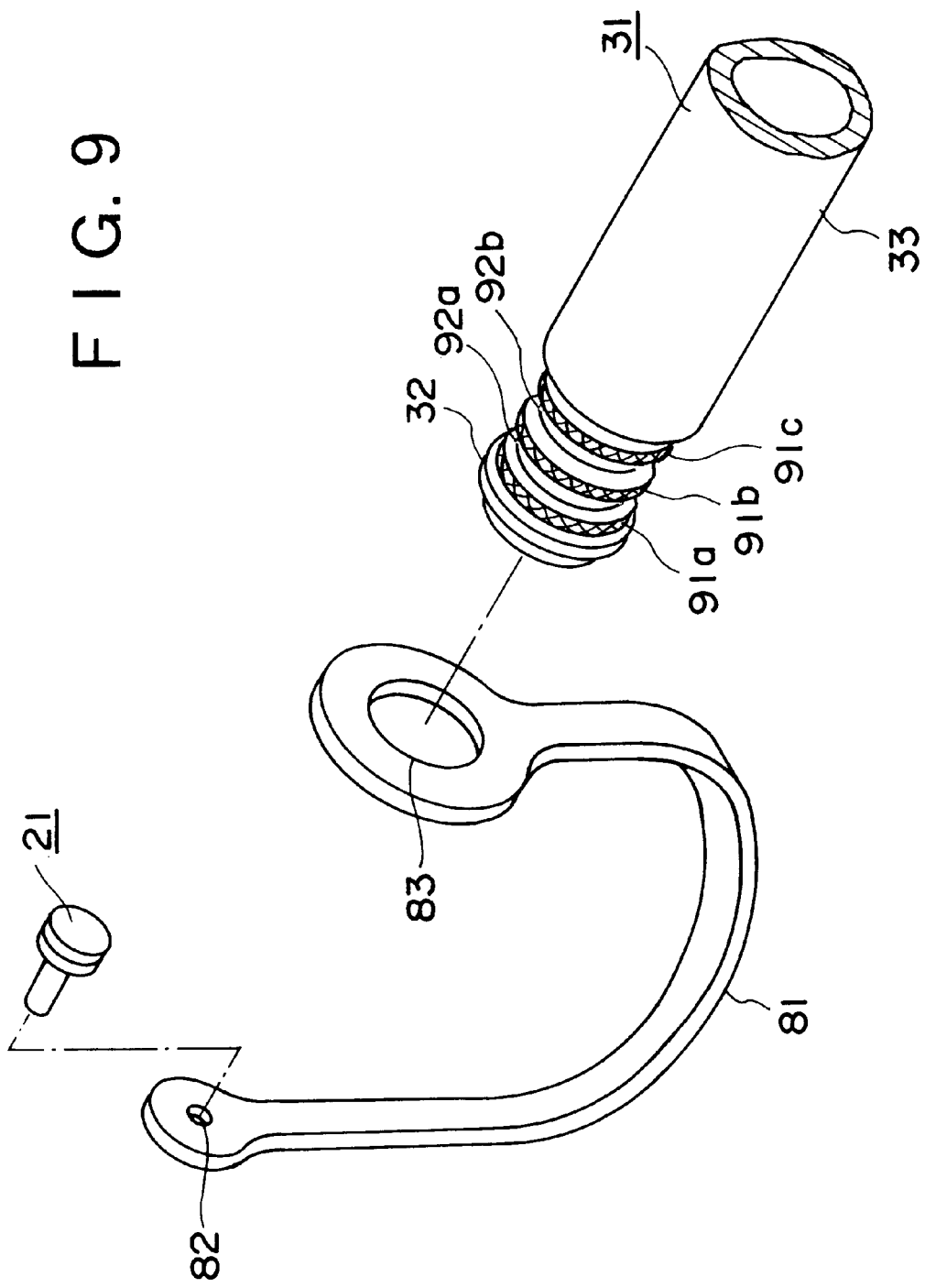
FIG. 9 is an exploded perspective view showing principal portion of the above embodiment.
Figure 10:
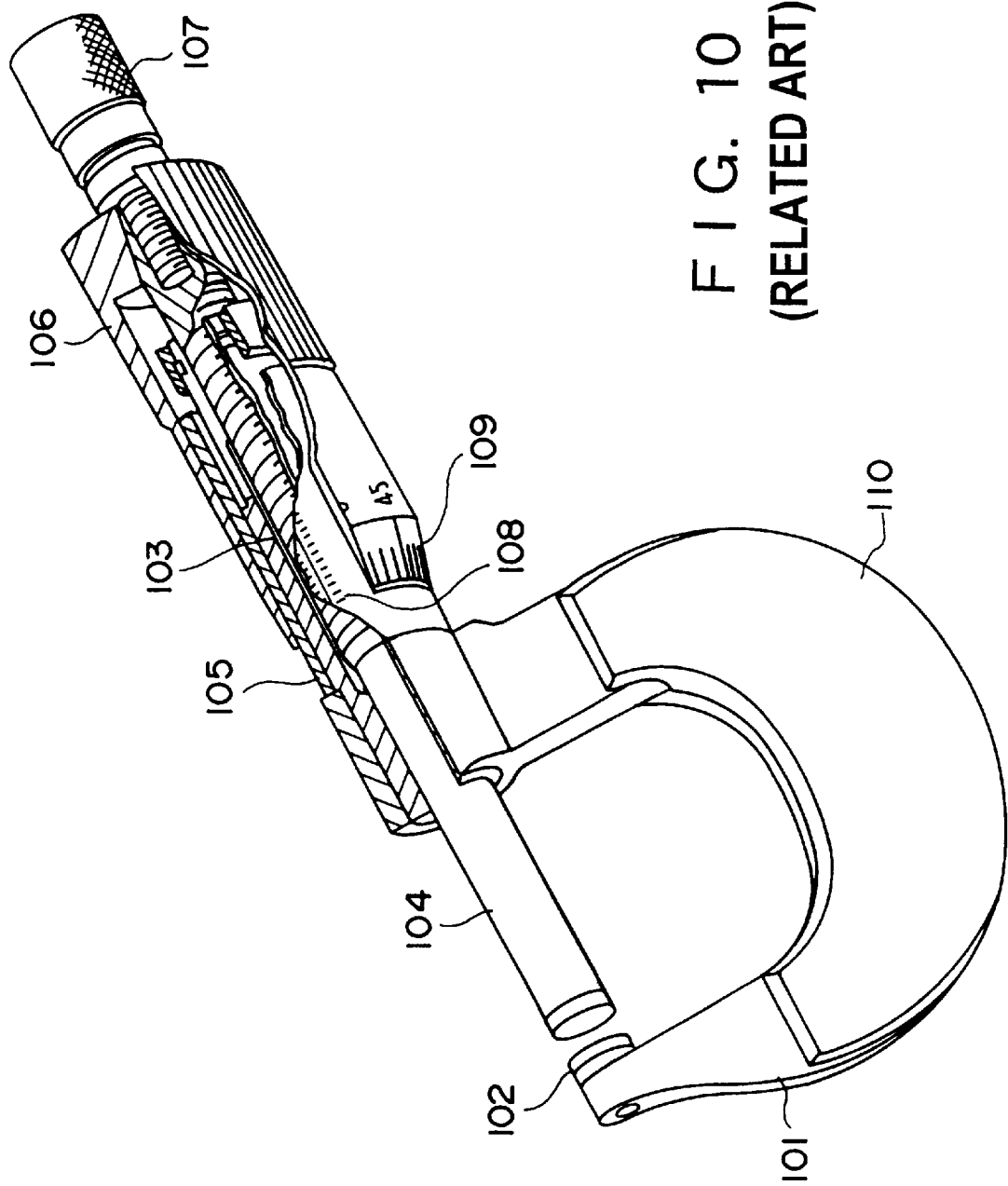
FIG. 10 is a perspective view showing the conventional micrometer.

FIG. 8 is a sectional view showing a micrometer of the second embodiment, and FIG. 9 is an exploded perspective view showing a principal portion thereof (main body portion). In the explanation of the following embodiment, the same reference numerals will be used to designate the same components as those in the first embodiment, so that the explanation will be omitted or simplified.

The micrometer in the present embodiment is basically provided with the same constituents as in the first embodiment, but the formation of the main body and the inner sleeve are different. So, the anvil 21, the spindle 41, the outer sleeve 51, the thimble 61, and the ratchet mechanism 71 are the same as in the first embodiment.

The main body of the present embodiment is made of glass-fiber reinforced engineering plastic which has a low thermal expansion rate, high rigidity, good heat resistance, good burning resistance, and good chemical resistance. Polyphenylene sulfite (PPS) is used here.

Inside the main body 11, a reinforcement member 81 is provided, which connects the anvil 21 to the inner sleeve 31. The reinforcement member 81 is formed in an almost U shape with a high rigid metal plate through stamping and bending processes as shown in FIG. 9. An anvil holding portion 82 which is in a hole shape and holds the anvil 21 is. formed at one end portion of the reinforcement member 81, and an inner sleeve holding portion 83 which is in a hole shape and holds the inner sleeve 31 is formed at the other end portion of the reinforcement member 81, through a stamping process respectively.

The inner sleeve 31 of the present embodiment is made of metal material (for instance, free-machining leaded steel: SOM) through a cutting process, and provided with the insert cylinder portion 32, the middle cylinder portion 33, and the screw cylinder portion 34 to which the screw portion 42 of the spindle 41 is screwed.

The insert cylinder portion 32 is formed to have an inner diameter to which the outer diameter of the spindle 41 inserts with no space between. And on the circumferential surface, a plurality of circular projections 91a, 91b, and 91c which have uneven outer surfaces processed by a knurling tool, as shown in FIG. 9, are formed. Circular treads 92a and 92b are also provided between each circular projections 91a, 91b and 91c.

Incidentally, the middle cylinder portion 33 and the screw cylinder portion 34 are the same as in the first embodiment.

The method of production is explained next.

The anvil 21 and the insert cylinder portion 32 of the inner sleeve 31 are inserted (press-fitted) into the anvil holding portion 82 and the inner sleeve holding portion 83 of the reinforcement member 81, respectively. After thus prepared reinforcement member 81 is set in a cavity of a mold as an inserting part, resin (engineering plastic) is injected to fill up into the cavity. The resin filled inside the cavity covers the anvil 21 and the outside of the insert cylinder portion 32 of the inner sleeve 31. Through this process, the main body 11, the anvil 21 and the inner sleeve 31 are integrally connected with each other.

Next, the outer sleeve 51 is placed and fixed to cover the outer surface of the inner sleeve 31. At the same time, the spindle 41 is inserted in the inside of the inner sleeve 31, and the screw portion 42 of the spindle 41 is screwed to the female screw 38 of the inner sleeve 31. Here, the clearance between both members is adjusted with a nut 40. Then the thimble 61 is placed to cover the outside of the outer sleeve 51 and the thimble 61 and the spindle 41 are integrally connected with the ratchet mechanism 71. Thus, the micrometer is produced.

According to the second embodiment, since the main body 11 which holds the anvil 21 at one end portion and the spindle 41 at the other end portion through the inner sleeve 31 is formed with engineering plastic, it is possible to reduce cost and weight compared with the cast article obtained by the conventional casting, while keeping the rigidity required during the measurement. Therefore the improvement of handling properties and operability can be achieved.

Since the main body 11 is molded by injection molding of engineering plastic, using the anvil 21 and the inner sleeve 31 as insert parts, the main body 11, the anvil 21 and the inner sleeve 31 are integrally connected to each other with the resin. Thus the whole rigidity can be enhanced.

Since the anvil 21 and the inner sleeve 31 are set and injection molded while being held by the reinforcement member 81 in the cavity of the mold, the positioning of the anvil 21 and the inner sleeve 31 can be exactly set up by the reinforcement member 81. After molding, since the anvil 21 and the inner sleeve 31 are held by the reinforcement member 81 as well as the engineering plastic to form the main body 11, the rigidity can be enhanced.

In the second embodiment, the reinforcement member 81 to connect the anvil 21 to the inner sleeve 31 is provided on the inner surface of the main body 11, but it may be provided on the outer surface, side surface or inside of the main body 11. And when an engineering plastic having a high rigidity is used, the reinforcement member 81 is not particularly needed.

In the first and second embodiments, the outer sleeve 51 and the thimble 61 are molded including the graduations 55 and 65 through double color injection molding using two different colored resins 52, 53, 62 and 63, and after that, the numerals 57 and 67 are formed through laser marking. But the graduations 55 and 65 as well as the numerals 57 and 67 may be molded from the beginning with the resin 52 and 62 which are used to mold the base tube 54 and 64, or the portions for numerals 57 and 67 can be removed by laser.

In the micrometer according to the present invention, since the frame, formed by bending of the metal plate which is processed in a designated size and shape, is used for the main body which holds the anvil at one end portion thereof and the spindle at the other portion thereof through the inner sleeve, it is possible to reduce cost and weight compared with the cast article obtained by the conventional casting, while keeping the rigidity required during the measurement and the accuracy against the temperature change of the working environment. And since the outer surface of the frame is covered with resin or a coating agent, it is possible to restrain the influence of thermal expansion caused by the heat of hand.

In the micrometer according to the present invention, since the main body is formed with the engineering plastic, it is possible to reduce cost and weight compared with the cast article obtained by the conventional casting, while the rigidity required during the measurement is ensured.

Furthermore, in the micrometer according to the present invention, since the main body is formed with the engineering plastic, and at the same time, the outer sleeve and the thimble are formed with resin, the influence of thermal expansion by the heat of hand can be restrained, in addition to the above effects.

What is claimed is:

1. A micrometer having a main body holding an anvil at one end portion thereof and a spindle, moving toward and away from said anvil, at the other end portion thereof through an inner sleeve, wherein said main body has a frame in a designated shape and size;

said frame has an anvil holding portion which holds said anvil at said one end portion thereof, and an inner sleeve holding portion which holds said inner sleeve at the other end portion thereof, the anvil holding portion and the inner sleeve holding portion being formed by a bending process;

said frame is formed with a pair of frame elements of approximately symmetrical configuration which are formed by bending metal plates stamped out in the designated shape and size; and an outer surface of said frame is covered with resin and at least a portion of a space between the pair of frame elements is filled with the resin, to rigidly combine the pair of frame elements the resin being integrated to the frame member by injection molding.

2. The micrometer according to claim 1, wherein the outer surface of said frame is covered with resin.

3. The micrometer according to claim 1, wherein a first circular projection whose outer diameter is nearly equal to the inner diameter of the inner sleeve holding portion of said frame, a second circular projection whose outer diameter is smaller than the outer diameter of said first circular projection and which has a bumpy outer surface, and a circular tread whose outer diameter is smaller than the outer diameter of said second circular projection, are formed on the outer circumferential surface of the inner sleeve held by said inner sleeve holding portion.

4. A micrometer having a main body holding an anvil at one end portion thereof and a spindle, moving toward and away from said anvil, at the other end portion thereof through an inner sleeve, wherein said main body has a frame in a designated shape and size;

said frame has an anvil holding portion which holds said anvil at said one end portion thereof, and an inner sleeve holding portion which holds said inner sleeve at the other end portion thereof, the anvil holding portion and the inner sleeve holding portion being formed by a bending process;

said frame is formed with a pair of frame elements of approximately symmetrical configuration which are formed by bending metal plates stamped out in the designated shape and size and an outer surface of said frame and at least a portion of a space between the pair of frame elements are coated with a coating agent to rigidly combine the pair of frame elements.

5. The micrometer according to claim 4, wherein a detent is formed on one of the frame elements and an aperture into which said detent is inserted is formed on the other frame element.

6. The micrometer according to claim 4, wherein each of said frame elements includes semi-cylindrical portions to form said anvil holding portion and said inner sleeve holding portion, when said frame elements are placed one upon the other.

7. The micrometer according to claim 4, wherein at least one of said pair of frame elements has a rib.

8. The micrometer according to claim 7, wherein said rib is formed along a peripheral end portion of said frame.

9. A micrometer having a main body holding an anvil at one end portion thereof and a spindle moving toward and away from said anvil at the other end portion thereof through an inner sleeve, wherein said main body is formed of engineering plastic and said anvil and said inner sleeve are connected with a metal reinforcement member integrated with the main body, anvil, and inner sleeve by injection molding to rigidly combine the metal reinforcement member with the main body, anvil, and inner sleeve.

10. The micrometer according to claim 9, wherein said reinforcement member is formed by bending a metal plate in a designated shape and size.

11. The micrometer according to claim 9, further comprising an outer sleeve that covers the outside of said inner sleeve and which is fixed to said inner sleeve, and a thimble being unified with said spindle on the outside of said outer sleeve in a manner such that the thimble can rotate, wherein said inner sleeve and said thimble are formed of resin.

12. The micrometer according to claim 11, wherein said reinforcement member is formed by bending a metal plate in a designated shape and size.

* * * * *